United States Patent [19]

Nitta

[11] Patent Number: 5,312,231
[45] Date of Patent: May 17, 1994

[54] SLURRY CONVEYOR DEVICE

[75] Inventor: Kozaburo Nitta, Osaka, Japan

[73] Assignee: Engineering Corporation, Osaka, Japan

[21] Appl. No.: 925,373

[22] Filed: Aug. 4, 1992

[51] Int. Cl.5 .................. F04B 23/08; B65G 53/46
[52] U.S. Cl. ................................ 417/86; 417/89;
    417/326; 417/179; 417/900; 406/67; 415/912
[58] Field of Search ............ 417/326, 85, 86, 87,
    417/89, 179, 900; 406/67; 418/108; 415/912

[56] References Cited

U.S. PATENT DOCUMENTS

| | | | |
|---|---|---|---|
| 2,757,049 | 7/1956 | Temple | 406/67 |
| 3,291,536 | 12/1966 | Smoot | 406/67 |
| 3,393,942 | 7/1968 | Hanaya | 406/67 |
| 3,934,937 | 1/1976 | Tee et al. | |
| 4,015,754 | 4/1977 | Leurs et al. | 406/67 |
| 4,463,844 | 8/1984 | Huffmann et al. | 241/79.1 |
| 4,487,553 | 12/1984 | Nagata | 417/179 |
| 4,609,155 | 9/1986 | Garnier | 241/101.2 |
| 4,645,439 | 2/1987 | Way | 418/108 |
| 4,846,638 | 7/1989 | Pahl et al. | 418/108 |

FOREIGN PATENT DOCUMENTS

| | | | |
|---|---|---|---|
| 0037783 | 4/1980 | European Pat. Off. | |
| 225937 | 6/1987 | European Pat. Off. | 418/108 |
| 170712 | 3/1905 | Fed. Rep. of Germany | |
| 597492 | 5/1934 | Fed. Rep. of Germany | |
| 1141228 | 6/1963 | Fed. Rep. of Germany | |
| 491573 | 9/1918 | France | |
| 197000 | 11/1984 | Japan | 417/179 |
| 4198526 | 4/1992 | Japan | |
| 282355 | 9/1990 | Netherlands | 406/900 |
| 1006674 | 3/1983 | U.S.S.R. | 417/900 |

OTHER PUBLICATIONS

European Search Report, EP 92 11 2721.

Primary Examiner—Richard A. Bertsch
Assistant Examiner—Roland G. McAndrews, Jr.
Attorney, Agent, or Firm—Thompson, Hine and Flory

[57] ABSTRACT

The objects of the invention are to prevent the backflow of slurry by first enclosing it in a closed space and then using air to force it along a discharge channel, and at the same time to ensure the smooth throughput of the slurry by causing any foreign bodies in the slurry to be broken up en route. To this end, the invention is provided with a casing enclosing a circular cross-section rotor chamber and a rotor which fits inside said rotor chamber and which is caused to rotate by a drive means. The rotor is also fitted with blades en bloc which extend radially from the rotating center section and which form moving chambers that rotate along with the rotor inside the rotor chamber. The casing is also provided with an intake port that connects with the moving chambers at the slurry intake point and a discharge port and air supply port, each of which connects with the moving chambers at the slurry discharge point.

11 Claims, 4 Drawing Sheets

SLURRY CONVEYOR DEVICE

BACKGROUND OF THE INVENTION

1. Field of the Invention

The invention relates to a slurry removal device which makes use of air for the purpose of said removal.

2. Description of the Prior Art

Conventionally, a slurry made of, for example, earth and sand, generated during the course of underground excavation work, has normally been brought up to the surface with the help of a screw conveyer.

When this sort of slurry is being removed, however, there is always the risk that, if the slurry does not contain much water or if the flow of the slurry is not regular, a backflow may occur.

There is a further danger that, if the slurry also contains empty cans, for example, the cans may get caught in the blades of the conveyer and impair its subsequent operation.

SUMMARY OF THE INVENTION

The objects of the invention are to prevent the backflow of slurry by first enclosing it in a closed space and then using air to force it along a discharge channel, and at the same time to ensure the smooth throughput of slurry by causing any foreign bodies that might be contained in the slurry to be broken up en route.

In order to achieve the above objects, the invention is provided with a casing enclosing a circular cross-section rotor chamber and a rotor which fits inside said rotor chamber and which is caused to rotate by a drive means. The rotor is also fitted en bloc with blades which extend radially from the rotating center section and which form moving chambers that rotate along with the rotor inside the rotor chamber. The casing is also provided with an intake port that connects with the moving chambers at the slurry intake point and a discharge port and an air supply port, each of which connects with the moving chambers at the slurry discharge point.

The slurry is thus input from the intake port into the moving chambers at the slurry intake point. The rotation of the rotor then drives the moving chambers in the direction of the slurry discharge point and the slurry is finally blown out of the discharge port by the force of the air from the air supply port.

Once the slurry has been enclosed in one of the moving chambers, it is eventually discharged with the help of the air and does not flow back.

Moreover, when the slurry is input into the moving chambers from the intake port, any foreign bodies contained in the slurry are broken up between the blades and the casing with the result that such foreign bodies do not get wedged in as they do in the case of the screw conveyer and there is thus no resultant impairment of operational efficiency.

DETAILED DESCRIPTION OF THE PREFERRED EMBODIMENT

Figure 1:
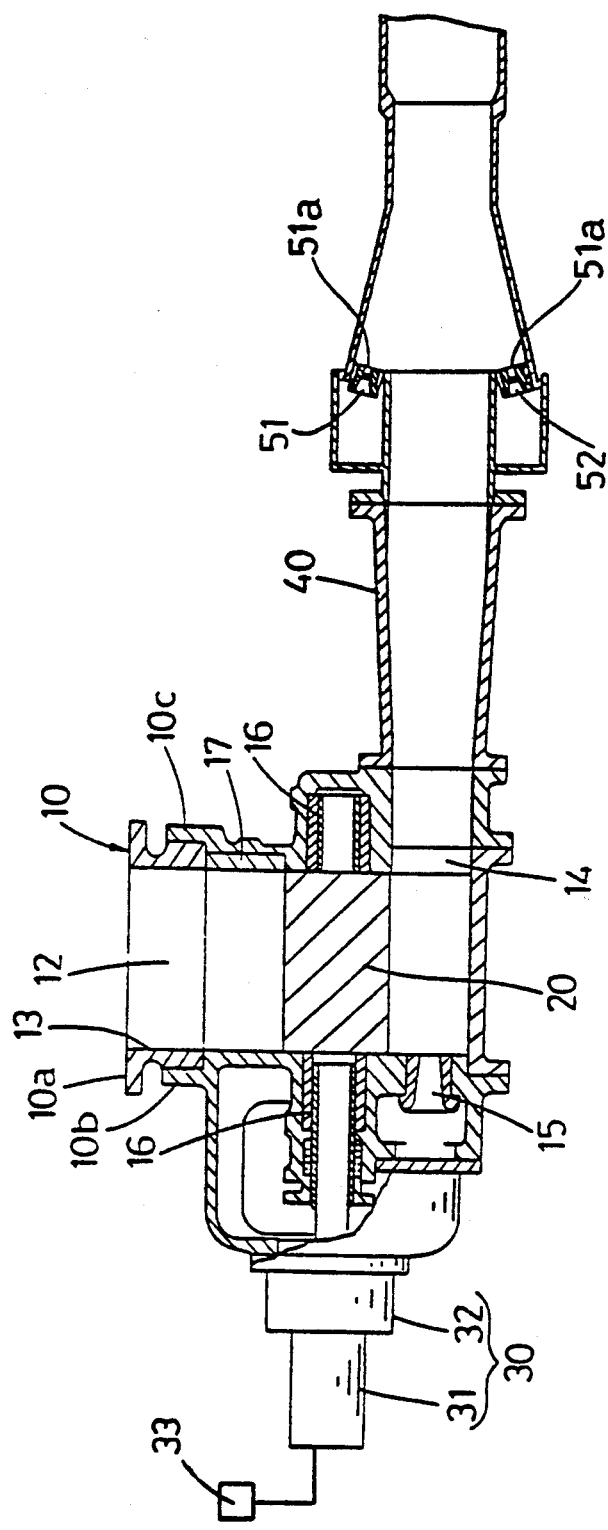
FIG. 1 is a longitudinally sectioned front view of the slurry removal device of the preferred embodiment.
Figure 2:
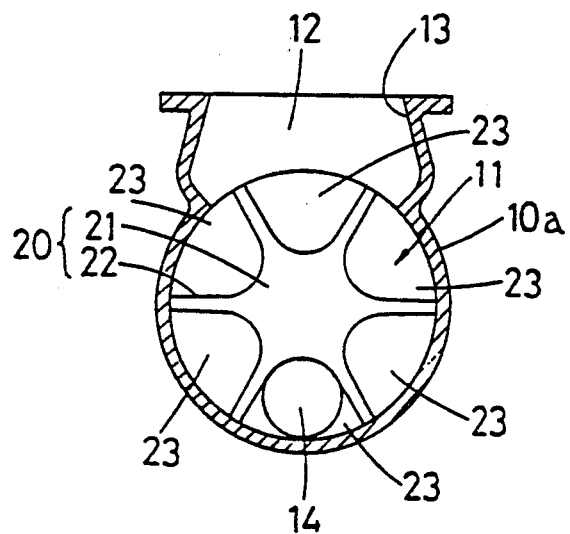
FIG. 2 is a longitudinally sectioned side view of the slurry removal device of the preferred embodiment.

There follows a description of the preferred embodiment of the invention by reference to the accompanying drawings. In FIG. 1 and FIGS. 2, 10 is a casing, which comprises a rotor housing 10a and side housings 10b,10c fitted to either side of said rotor housing 10a inside of which a circular cross-sectioned rotor chamber 11 is formed. A high chrome cast iron rotor 20 fits snugly inside said rotor chamber 11 in such a way that it is able to rotate quite freely. The rotor 20 comprises a rotating center section 21 and six blades 22, which are fitted en bloc to said rotating center section 21. The blades 22 extend radially away from the rotating center section 21, thereby forming six moving chambers 23, which rotate along with the rotor 20 inside the rotor chamber 11. The rotating center section 21 is supported by submerged bearings 16 which are incorporated into the side housings 10b,10c. A side plate 17 is fitted inside the side housing 10c at the point where the edges of the blades 22 brush against the housing. Said side plate is attached to the side housing 10c through the medium of a screw type position adjustment mechanism, said adjustment mechanism being used to adjust for perfect clearance between the side plate 17 and the rotor 20. Water running out of the submerged bearings 16 has the beneficial effect of washing away any earth and sand that might find its way into the gap between the side plate and the rotor 20.

The side housing 10b contains a drive means 30 comprising a hydraulic system motor 31 and a reducer 92, which is attached directly to the shaft. One end of the aforementioned rotating center section 21 passes through the side housing 10b where it is linked to the output shaft of said reducer 32. Thus, when the hydraulic system motor 31 rotates, the six moving chambers 23 also rotate with the result that, during the course of their rotation, each of the six chambers in turn comes into line first with the slurry intake point (at twelve o'clock in FIG. 2) and then with the slurry discharge point (at six o'clock in FIG. 2). If the hydraulic system motor 31 exceeds the specified rotation resistance value. The control system will ensure that the direction of rotation is temporarily reversed. At the top of the rotor housing 10a, there is an open intake port 12 which connects with the moving chambers 23 at the slurry intake point. A guide fitting 13 is erected around the edge of the intake port 12. One side housing 10c contains an open discharge port 14 which connects with the moving chambers 23 at the slurry discharge point. The other side housing 10b contains an open air supply port 15 which connects with the moving chambers 23 at the slurry discharge point. The air supply port 15 is itself supplied with compressed air from a compressor (omitted from the drawing). A discharge pipe 40 is connected to the aforementioned discharge port 14. The discharge pipe 40 itself is fitted with two air ejectors 51,52. The central axis of the nozzle of each of said air ejectors 51,52 is oriented inwards at a predetermined angle (for example, 15 degrees) to the central axis of the discharge pipe 40 such that said axes intersect on the central axis on its downstream side. Compressed air is supplied from a compressor to said air ejectors 51,52 from which it is blown out through two ejector nozzles 51a,52a in the downstream direction.

Thus, in the preferred embodiment outlined above, slurry which is introduced into the guide fitting 13 is first transferred through the intake port 12 into a moving chamber 23 at the slurry intake point. The action of the rotor 11 then drives the moving chamber 23 round to the slurry discharge point at which a jet of air from the air supply port 15 forces the slurry through the discharge port 14 and out along the discharge pipe 40. The pressure generated by the jets of air blown from the air ejectors 51,52 serves to relay the slurry further downstream.

The slurry is thus enclosed within a moving chamber 23 and subsequently forced from said chamber by a jet of air, thereby preventing flow back.

Moreover, when the slurry is transferred from the slurry intake port 12 into the moving chamber 23, any foreign bodies which are contained in the slurry are cut to pieces between the rotor housing 10a and the blades 22, thereby preventing the sorts of problems that can occur in the case of machines such as screw conveyers when foreign bodies become jammed in the moving parts.

The invention makes use of a hydraulic system motor 31 to drive the rotor 20 so that, even if it is assumed for the moment that a foreign body of some sort does become wedged in the machinery and the rotor is brought to a standstill, the drive means 30 will nevertheless not be put under an excessive load. Moreover, if the rotation resistance rises above a predetermined level, the hydraulic system motor 31 temporarily reverses the direction of its rotation. The effect of repeated changes in the direction of rotation between forward and reverse is to dislodge any foreign body that might have become wedged in the mechanism and to convey it in one of the moving chambers 23 to the discharge point from which it is then discharged smoothly along with the slurry.

Figure 3:
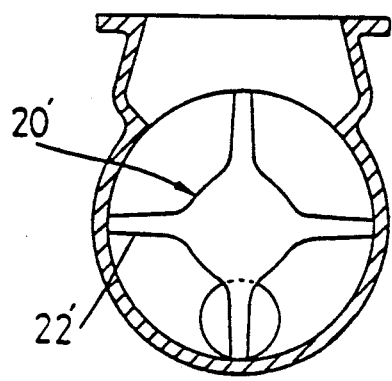
FIG. 3 is a longitudinally sectioned side view of a modified embodiment of the invention.

FIG. 3 illustrates a modified embodiment of the invention. In the preferred embodiment described above, there were six rotor blades 22. In the modified embodiment, however, the rotor 20' is fitted with only four blades 22'. The operation and effect of the modified device is in all other respects identical to that of the slurry removal device of the preferred embodiment.

Figure 4:
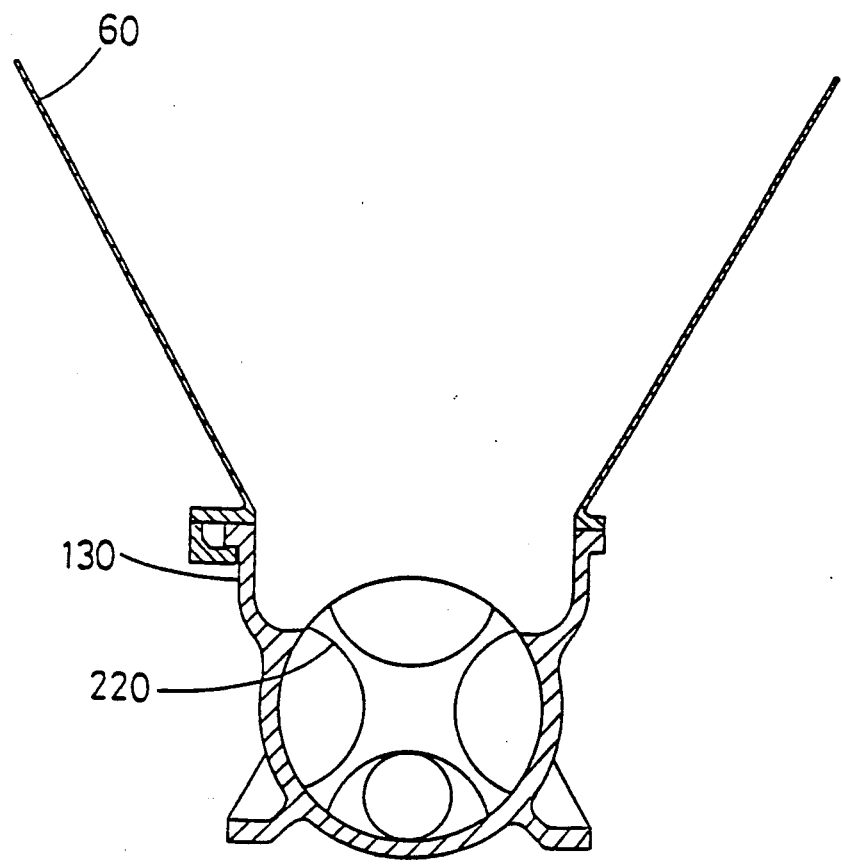
FIG. 4 is a longitudinally sectioned side view of a further modified embodiment of the invention.

FIG. 4 illustrates a further modified embodiment of the invention. The edges of the guide fitting 130 and the blades 220 of the present modified embodiment of the invention have been made much sharper than those of the first modified embodiment outlined above, thereby significantly enhancing the device's capacity to cut foreign bodies in the slurry to pieces. 60 is a hopper which is fitted to the upper part of the casing 10 in order to channel the slurry into the guide fitting 130.

Figure 5:
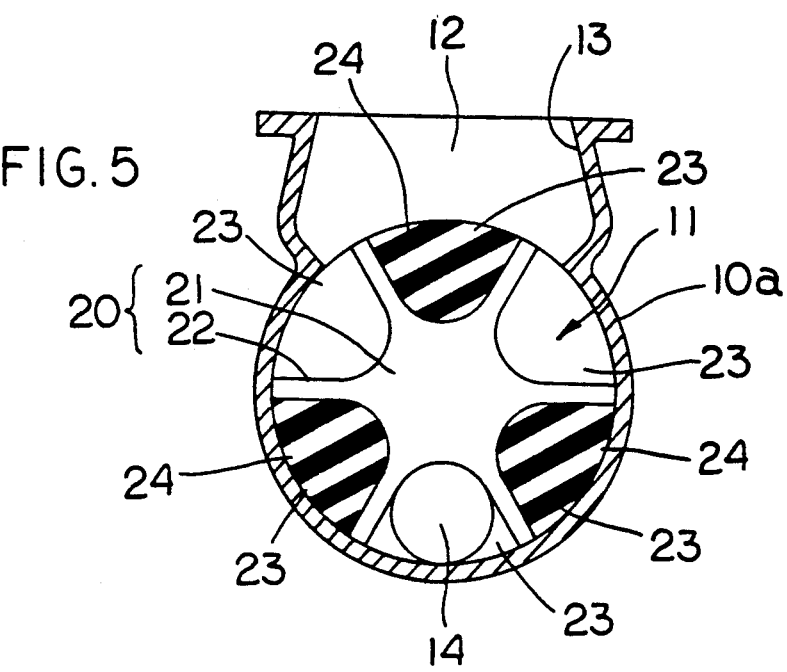
FIG. 5 is a longitudinally sectioned side view of a further modified embodiment of the invention.

In the preferred embodiment described above, the rotor 20 is fitted with six blades which in turn form six moving chambers 23. As shown in FIG. 5, if every other chamber between the blades is filled with rubber 24, or example, in order to block it off, this will leave just three moving chambers 23 with a longer interval between each one. The discharge of slurry from the discharge port 14 into the discharge pipe 40 will in this case become noticeably intermittent, thereby creating a plug flow (flow of slurry alternating with air).

What is claimed is:

1. A slurry conveyor device comprising:
   a casing incorporating a circular cross-section rotor chamber;
   a rotor which fits inside said rotor chamber in said casing and which is caused to rotate by a drive means; and
   a plurality of blades which extend radially from a rotating center section of said rotor and which form moving chambers inside said rotor chamber which rotate along with said rotor, wherein alternate moving chambers between said blades of said rotor are filled with rubber, said casing having an intake port which connects with said moving chambers at a slurry intake point, a discharge port which connects with said moving chambers at a slurry discharge point, and an air supply port which connects with said moving chambers at the slurry discharge point.

2. The slurry conveyor device according to claim 1 in which
   said casing comprises a rotor housing with a side housing fitted on either side.

3. The slurry conveyor device according to claim 1 in which
   said rotating center section is supported by submerged type bearings.

4. The slurry conveyor according to claim 1 further comprising means for adjusting the position of said casing with respect to said blades.

5. The slurry conveyor device according to claim 4 wherein said adjusting means is a side plate which comes into contact with the edges of said blades and is fitted to said casing through the medium of a position adjustment mechanism which adjusts the clearance with the rotor.

6. The slurry, conveyor device according to claim 1 in which
   said drive means comprising a hydraulic system motor and a reducer, which is connected directly to the shaft, and
   the rotating center section of said rotor is linked to said reducer.

7. The slurry conveyor device according to claim 6 which further comprises
   a control means which causes said hydraulic system motor to temporarily reverse the direction of its rotation in cases in which the rotation resistance rises above a predetermined value.

8. The slurry conveyor device according to claim 2 in which
   said intake port stands open at the top of said rotor housing,
   said discharge port stands open in one of said side housings, and
   said air supply port stands open in the other of said side housings.

9. The slurry conveyor device according to claim 1 in which
   a discharge pipe is connected to said discharge port, and
   said discharge pipe is fitted with an air ejector that receives a supply of compressed air which it blows out of an ejector nozzle in a downstream direction.

10. The slurry conveyor device according to claim 9 in which
    two of said air ejectors are fitted in such a way that the central axis of the nozzle of each of said air ejectors is oriented inwards at a predetermined angle to the central axis of the discharge pipe such that the two nozzle axes intersect on the central discharge pipe axis on the downstream side.

11. The slurry conveyor device according to claim 1 in which
    the inside edge of said discharge port in said casing and the edges of said blades have been made sharp.

* * * * *

UNITED STATES PATENT AND TRADEMARK OFFICE
CERTIFICATE OF CORRECTION

PATENT NO. : 5,312,231
DATED : May 17, 1994
INVENTOR(S) : Kozaburo Nitta

It is certified that error appears in the above-identified patent and that said Letters Patent is hereby corrected as shown below:

TITLE PAGE, ITEM [73]

Please change the Assignee to:  --Koyo Technical Engineering Corporation--.

Signed and Sealed this

Thirteenth Day of September, 1994

Attest:

BRUCE LEHMAN

Attesting Officer

Commissioner of Patents and Trademarks